United States Patent
Zhu

(10) Patent No.: US 10,094,000 B2
(45) Date of Patent: Oct. 9, 2018

(54) METHOD FOR SEPARATING THE MIXTURE OF ZIRCONIUM OXIDE/HAFNIUM OXIDE BY PYROMETALLURGY

(71) Applicant: Xingfeng Zhu, Wuxi (CN)

(72) Inventor: Xingfeng Zhu, Wuxi (CN)

( * ) Notice: Subject to any disclaimer, the term of this patent is extended or adjusted under 35 U.S.C. 154(b) by 242 days.

(21) Appl. No.: 15/102,255

(22) PCT Filed: Sep. 29, 2014

(86) PCT No.: PCT/CN2014/087812
§ 371 (c)(1),
(2) Date: Jun. 6, 2016

(87) PCT Pub. No.: WO2015/085818
PCT Pub. Date: Jun. 18, 2015

(65) Prior Publication Data
US 2016/0348212 A1    Dec. 1, 2016

(30) Foreign Application Priority Data

Dec. 12, 2013  (CN) .......................... 2013 1 0682029

(51) Int. Cl.
| | | |
|---|---|---|
| *C22B 5/00* | (2006.01) | |
| *C22B 7/00* | (2006.01) | |
| *C22B 9/02* | (2006.01) | |
| *C01G 25/04* | (2006.01) | |
| *C01G 27/04* | (2006.01) | |
| *C22B 15/00* | (2006.01) | |
| *C22B 34/14* | (2006.01) | |

(52) U.S. Cl.
CPC .............. *C22B 34/14* (2013.01); *C01G 25/04* (2013.01); *C01G 27/04* (2013.01); *C22B 5/00* (2013.01); *C22B 7/002* (2013.01); *C22B 9/02* (2013.01); *C22B 15/008* (2013.01); *C22B 15/0073* (2013.01); *Y02P 10/234* (2015.11)

(58) Field of Classification Search
CPC .. C22B 5/00; C22B 7/002; C22B 9/02; C22B 34/14; C01G 25/04; C01G 27/04
USPC .................................. 423/72, 76, 77, 82, 84
See application file for complete search history.

(56) References Cited

U.S. PATENT DOCUMENTS

| | | | | |
|---|---|---|---|---|
| 3,053,620 A | * | 9/1962 | Greenberg ............. | C01G 25/04 203/41 |
| 4,910,009 A | * | 3/1990 | Sommers ................. | C01B 9/00 423/135 |
| 2008/0105536 A1 | * | 5/2008 | Auner .................... | B01J 19/126 204/157.43 |

FOREIGN PATENT DOCUMENTS

| | | | | | |
|---|---|---|---|---|---|
| GB | 790345 A | * | 2/1958 | ............. | C01G 25/04 |
| RU | 2329951 | * | 7/2008 | | |

OTHER PUBLICATIONS

Otake, Yasumoto. "Study on determination of oxygen in titanium and zirconium by bromination-carbon reduction method." Journal of Japan Institute of Light Metals. 8(5) pp. 65-73 and 11. doi:10.2464/jilm.8.5_66 (Year: 1958).*
RU 2329951. Machine translation of the description. (Year: 2008).*

* cited by examiner

*Primary Examiner* — George Wyszomierski
*Assistant Examiner* — Tima M McGuthry-Banks
(74) *Attorney, Agent, or Firm* — CBM Patent Consulting, LLC

(57) ABSTRACT

A method for separating zirconium oxide/hafnium oxide by pyrometallurgy. The mixture of zirconium oxide/hafnium oxide, carbon and pure bromine react one hour at 650° C., then added to molten salt mixture for rectifying separation, and then maintained two hours at rectifying tower bottom below 357° C., to get the non-target substance; and then maintained five hours at 357° C. to collect the target substance zirconium tetrabromide; the residue in the reactor is retained, then rectification separation is performed in the same device, heated to 400° C. to retain more than five hours, to get hafnium tetrabromide, then the zirconium tetrabromide and hafnium tetrabromide are substituted by magnesium to get the pure zirconium and pure hafnium.

5 Claims, No Drawings

METHOD FOR SEPARATING THE MIXTURE OF ZIRCONIUM OXIDE/HAFNIUM OXIDE BY PYROMETALLURGY

This application is the U.S. national phase of International Application No. PCT/CN2014/087812 Filed on 9 Sep. 2014 which designated the U.S. and claims priority to Chinese Application Nos. CN2 01310682029.8 filed on 12 Dec. 2013, the entire contents of each of which are hereby incorporated by reference.

TECHNICAL FIELD

This invention relates to a zirconium/hafnium separation method, in particular, to a method for separating the mixture of zirconium oxide/hafnium oxide by pyrometallurgy.

BACKGROUND ART

Zirconium and hafnium have unique performance of high-temperature resistance, radiation resistance, corrosion resistance. In the nuclear industry, zirconium alloy is used as reactor cladding and structural material, and hafnium is used as the control material of reactor. Zirconium and hafnium are also widely used in the fields of chemical industry, metallurgy, electronics, etc.

Zirconium and hafnium have very similar chemical properties, and usually mutualistic symbiosis in the ores in the form of oxide. In natural zirconium resources, generally the mass fraction of hafnium is 1.5% to 3% of the zirconium; and in contrast, the nuclear grade sponge zirconium requires w(Hf)<0.01%. Therefore, zirconium and hafnium separation technology is the key for the production of nuclear grade sponge zirconium. In many countries, the method of separating zirconium, hafnium has been studied. Currently, these methods are roughly divided into two categories: hydrometallurgical separation and pyrometallurgical separation.

The hydrometallurgical separation mainly includes MIBK-HCL method, TOA method, TBP-HCL-HNO3 method, improved N235-H2SO4 method and sulfoxides extraction method, etc.

The main principle of pyrometallurgical separation is to separate zirconium and hafnium in the rectifying tower by using the difference of saturated vapor pressure of HfCl4 and ZrCl4 in the molten KAlCl4, and finally to get 30%~50% enrichment of w(HfCl4) and atomic level of ZrCl4.

The company that uses this technology is COMPAGNIE EUROPEENNE DU ZIRCONIUM-CEZUS. In its patent US20090117018 (publication date: Feb. 7, 2008), the invention titled Process for the separation and purification of hafnium and zirconium disclosed a similar method. By the carbochlorination of zircon core, the mixture of ZrCl4 and HfCl4 is obtained, and the reaction process is as the following equations (1) and (2):

$$ZrSiO4+4C=ZrC+SiO+3CO \quad (1)$$

$$ZrC+2Cl2=ZrCl4+C \quad (2)$$

ZrCl4 and HfCl4 enter from the middle of the tower, to separate zirconium, hafnium under the condition of atmospheric pressure and 350° C. of tower temperature. The rectifying tower has a number of tower plates, and each tower plate supports the molten salt layer. ZrCl4 fractions are recovered in the solvent phase at the bottom of the tower, while the HfCl4 enriched residual fractions are generated in the vapor phase. The method has the following characteristics: less consumption of chemical reagents, less waste pollution, short separation process, direct connection with the metal reduction process. Its shortcoming is that the equipment and delivery system are carried out at 350~500° C., which has high requirement for the equipments, with poor purification and impurity removal, large investment, suitable for large-scale zirconium and hafnium smelter.

SUMMARY OF THE INVENTION

In order to overcome the above drawbacks and shortcoming in the prior art, this invention provides a method for separating the mixture of zirconium oxide/hafnium oxide by pyrometallurgy, comprising the following steps:

The mixture of zirconium oxide/hafnium oxide, carbon and pure bromine react one hour at 650° C. to get the mixture of zirconium tetrabromide and hafnium tetrabromide;

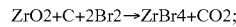
ZrO2+C+2Br2→ZrBr4+CO2;

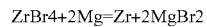
HfO2+C+2Br2→HfBr4+CO2;

add the mixture of zirconium tetrabromide and hafnium tetrabromide to molten salt for rectification separation, and the rectifying tower bottom is maintained two hours below 357° C., to get the non-target substance at the top of the tower, and the molten salt is the molten mixture of potassium fluorine and aluminum potassium sulfate with a weight ratio of 1.2~1.6:1;

maintain five hours at 357° C.~360° C., to collect zirconium tetrabromide at the top of the tower; retain the residues in the reactor;

perform rectification separation in the same device, heat to 400-403° C. to maintain more than five hours, and then collect the hafnium tetrabromide at the top of the tower.

Preferably, the temperature of the colleted zirconium tetrabromide is maintained at 357° C.

Preferably, the temperature of the colleted hafnium tetrabromide is maintained at 400° C.

Perform magnetism replacement of the collected zirconium tetrabromide and hafnium tetrabromide to get pure zirconium and pure hafnium.

ZrBr4+2Mg=Zr+2MgBr2

HfBr4+2Mg=Hf+2MgBr2

Compared to the prior art, carbon bromination is adopted instead of the conventional carbon chlorination. The difference in boiling point between zirconium bromide and hafnium bromide is greater than that between the zirconium chloride and hafnium chloride, thus, the separation effect is better, equipment investment is small, easy to achieve industrialization. This invention technology can fill the gap in china, to make great contributions to the localization of zirconium and hafnium nuclear materials.

DETAILED DESCRIPTIONS OF THE PREFERRED EMBODIMENTS

The invention is further described in details in combination with several preferred embodiments. The embodiments herein are only used to clarify this invention rather than a limitation on the mode of execution of the invention.

Embodiment 1

The zirconium, hafnium oxides are added in a high-temperature corrosion-resistant ceramic reactor, then the corresponding carbon is added. The vaporized pure bromine is added to the high-temperature reactor through the nitrogen, to maintain the reactor at 650° C.; when the raw material bromine is added, maintained one hour at 650° C., then cooled down to get the mixture of zirconium tetrabromide and hafnium tetrabromide.

The next step is separation in the rectifying tower. The mixture of zirconium tetrabromide and hafnium tetrabromide is added in a high-temperature corrosion-resistant ceramic reactor, then the molten salt mixture is added, and the molten salt is the mixture of the potassium fluorine and aluminum potassium sulfate at a weight ratio of 1.2~1.6:1, then maintained two hours below 357° C., to get the non-target substance, then maintained five hours at 357° C., to collect the target substance of high purity of zirconium tetrabromide compound. The residues are retained in the reactor, since it has small amount; when N batches are collected and sufficient raw materials are available, perform rectification separation in the same device, heat to 400° C. to maintain more than five hours, to get the highly pure hafnium tetrabromide compound.

All distillation equipments in the invention are domestic equipments; infrared heating, ceramic materials are used, and the filler in the rectifying tower is corrugated ceramic filler. The synthesis of nuclear grade materials: the highly pure zirconium tetrabromide and hafnium tetrabromide compounds obtained through rectification and separation and the magnesium powder have a reduction reaction, to get the high-purity zirconium sponge and high-purity hafnium sponge. It can be used for deep processing and production of nuclear zirconium and nuclear hafnium materials.

What is claimed is:

1. A method for separating zirconium oxide and hafnium oxide from a mixture of zirconium oxide and hafnium oxide comprises the following steps:

mixing the mixture of zirconium oxide and hafnium oxide, carbon and pure bromine, reacting one hour at 650° C. which results in a mixture of zirconium tetrabromide and hafnium tetrabromide;

adding the mixture of zirconium tetrabromide and hafnium tetrabromide into molten salt for rectification separation, and maintaining the rectification for two hours at 200-357° C. which yields a non-target substance at the top of a rectification tower, wherein the molten salt is a molten mixture of potassium fluoride and aluminum potassium sulfate with a weight ratio of 1.2-1.6:1;

maintaining for additional five hours at 357° C.-360° C., collecting a target substance zirconium tetrabromide from the top of the rectification tower;

performing the rectification separation in the rectification tower, heat up to 400-403° C. and maintaining for five hours, and then collecting the hafnium tetrabromide from the top of the rectification tower.

2. The method according to claim 1, wherein the temperature for collecting the zirconium tetrabromide is 357° C.

3. The method according to claim 1, wherein the temperature for collecting the hafnium tetrabromide is 400° C.

4. The method according to claim 1, wherein it further comprises: performing a magnetism replacement for the zirconium tetrabromide which yields a pure zirconium.

5. The method according to claim 1, wherein it further comprises: performing a magnetism replacement for the hafnium tetrabromide which yields a pure hafnium.

* * * * *